UNITED STATES PATENT OFFICE.

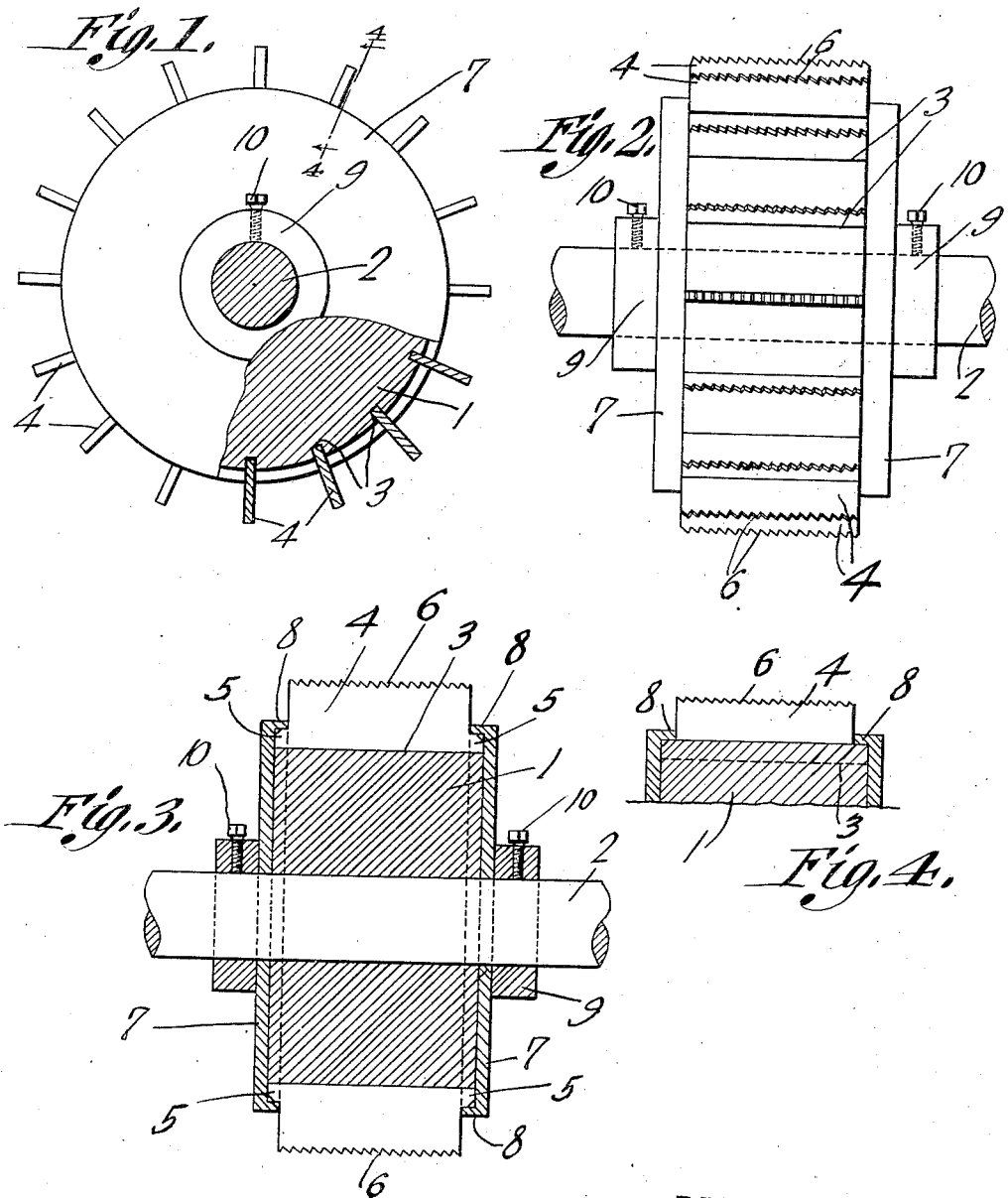

WALTER P. WEST, OF NAPA, AND JAY HARLEY SMITH, OF SAN FRANCISCO, CALIFORNIA.

ROTARY RASP.

1,379,146.

Specification of Letters Patent.  Patented May 24, 1921.

Application filed August 7, 1919.  Serial No. 315,984.

*To all whom it may concern:*

Be it known that we, WALTER P. WEST and JAY HARLEY SMITH, citizens of the United States, residing, respectively, at Napa and San Francisco, in the counties of Napa and San Francisco, State of California, have invented a new and useful Rotary Rasp, of which the following is a specification.

This invention relates to a rotary rasp or buffer for use in removing the tread portions of old tire casings preparatory to retreading them, and one of its objects is to provide a rotary head having a series of removable blades held in place in a novel manner and which can be renewed when desired.

A further object is to provide renewable blades which are inexpensive and durable and can be easily cleaned and sharpened.

Another object is to provide a device of the character stated the parts of which are held together securely while the device is in use.

With the foregoing and other objects in view which will appear as the description proceeds the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings

Figure 1 is a side elevation, partly in section, of the rotary rasp or buffing tool.

Fig. 2 is a front elevation thereof.

Fig. 3 is a central transverse section through the device.

Fig. 4 is a transverse section through a portion of the wheel at a point between two of the blades, on line 4—4, Fig. 1.

Referring to the figures by characters of reference 1 designates a cylindrical head having a shaft 2 extending therethrough and adapted to be driven in any manner desired. Grooves 3 are extended longitudinally within the periphery of the head and are adapted to receive the inner longitudinal edges of blades 4 provided with ears 5 at the ends thereof and which terminate flush with the faces of the head. The outer longitudinal edges of the blades are formed with teeth 6 and these teeth can be sharpened. Disks 7 are fitted against the flat faces of the head 1 and have inwardly extending annular flanges 8 which engage the periphery of the head and extend over the ears 5. Collars 9 are arranged on the shaft 2 and are adapted to be adjusted against the disks where they can be held by means of set screws 10 or in any other way desired.

It will be apparent that when the several parts are assembled and fastened they will rotate as one body with the shaft 2. The device is adapted to be driven at a high speed and when brought into operative position upon the tread portion of a tire casing the teeth 6 will tear off the rubber tread or other part engaged thereby and the entire device will constitute an efficient rasp or buffer. Should one or more of the blades become worn or broken it could be removed by unfastening one or both of the disks 7 so as to release the ears 5. The blade or blades can then be removed and sharpened or discarded and others substituted.

It will be seen that the device is very simple and efficient and is especially advantageous when used for the purpose herein set forth.

What is claimed is:—

A rotary rasp for rubber tires including a cylindrical head having longitudinal grooves in its periphery, radially extending blades seated in the grooves and having toothed outer edges, ears extending from the ends of each blade at the inner edge of the blade, the outer ends of the ears being flush with the ends of the head, one edge of each ear being flush with the periphery of the head, disks detachably connected to the opposed ends or faces of the head, and inwardly extending annular flanges upon the disks and engaging the periphery of the head and those edges of the ears flush with the periphery, the outer ends of the ears abutting against the disks and the end edges of the blades abutting against the flanges.

In testimony that we claim the foregoing as our own, we have hereto affixed our signatures in the presence of two witnesses.

WALTER P. WEST.
JAY HARLEY SMITH.

Witnesses:
HENRY B. LISTER,
JOHN H. CRABBE.